United States Patent [19]

Ishii et al.

[11] Patent Number: 4,603,159

[45] Date of Patent: Jul. 29, 1986

[54] PHENOLIC COMPOUNDS AND STABILIZERS CONTAINING THE SAME

[75] Inventors: Tamaki Ishii, Suita; Shinichi Yachigo, Toyonaka; Manji Sasaki, Ibaraki; Haruki Okamura, Osaka; Masahisa Shinoya, Izumi, all of Japan

[73] Assignee: Sumitomo Chemical Company, Ltd., Osaka, Japan

[21] Appl. No.: 706,165

[22] Filed: Feb. 27, 1985

[30] Foreign Application Priority Data

Feb. 29, 1984 [JP] Japan ................................ 59-39196
Apr. 4, 1984 [JP] Japan ................................ 59-68330

[51] Int. Cl.⁴ .............................................. C08K 5/37
[52] U.S. Cl. .................................... 524/108; 524/291; 524/302
[58] Field of Search ................... 524/108, 302, 291

[56] References Cited

U.S. PATENT DOCUMENTS

| | | | |
|---|---|---|---|
| 3,285,855 | 11/1966 | Dexter et al. | 524/291 |
| 3,629,194 | 12/1971 | Onishi et al. | 524/302 |
| 3,644,482 | 2/1972 | Dexter et al. | 260/473 R |
| 3,758,549 | 9/1973 | Dexter et al. | 524/302 |
| 3,966,675 | 6/1976 | Schurdak et al. | 260/45.8 NT |
| 4,507,417 | 3/1985 | Ishii et al. | 524/108 |

FOREIGN PATENT DOCUMENTS 185330 11/1982 Japan .
20337 2/1984 Japan .

*Primary Examiner*—Veronica P. Hoke
*Attorney, Agent, or Firm*—Wenderoth, Lind & Ponack

[57] ABSTRACT

Synthetic resins, such as polyolefins, are stabilized with phenolic compounds of the formula

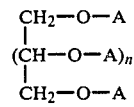

where n is 1 to 4 and A is

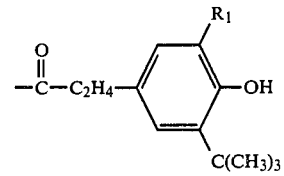

where $R_1$ is $C_1$-$C_3$ alkyl.

8 Claims, No Drawings

PHENOLIC COMPOUNDS AND STABILIZERS CONTAINING THE SAME

The present invention relates to a phenolic type compound represented by the general formula (I),

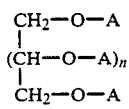

wherein n represents an integer of 1 to 4, and A represents a group of the formula formula,

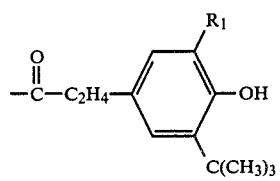

in which $R_1$ is a $C_1$–$C_3$ alkyl group,
a stabilizer for synthetic resins containing said compound as an active ingredient and stabilized synthetic resins containing said stabilizer.

Various kinds of synthetic resin such as polyolefins (e.g. polyethylene, polypropylene), styrene type synthetic resins (e.g. polystyrene, impact-resistant polystyrene, ABS), engineering plastics (e.g. polyacetal, polyamide), polyurethane, etc. are widely used in various fields. It is however well known that when these synthetic resins are used alone, their stability becomes a problem, for example they deteriorate by the action of heat, light and oxygen on processing or use, thereby showing a remarkable reduction in mechanical properties accompanied by phenomena such as softening, embrittlement, surface cracks, discoloration and the like.

It is also hitherto well known that, in order to solve this problem, various phenolic, phosphite-type or sulfur-containing antioxidants are added or used in the course of production and processing of synthetic resins. For example, it is well known that phenolic type antioxidants such as 2,6-di-tert-butyl-4-methylphenol, 2,2'-methylenebis(4-methyl-6-tert-butylphenol), 4,4'-butylidenebis(3-methyl-6-tert-butylphenol), n-octadecyl 3-(3,5-di-tert-butyl-4-hydroxyphenyl)propionate, 1,1,3-tris(2-methyl-4-hydroxy-5-tert-butylphenyl)butane, pentaerythritol tetrakis[3-(3,5-di-tert-butyl-4-hydroxyphenyl)propionate] and the like are used alone, or these phenolic type antioxidants are used in combination with phosphite-type antioxidants such as tris(nonylphenyl)phosphite, distearyl pentaerythritol diphosphite and the like, or sulfur-containing antioxidants such as dilauryl thiodipropionate, dimyristyl thiodipropionate, distearyl thiodipropionate and the like.

But, this method is not yet satisfactory in terms of thermal and oxidation stability, thermal discoloration resistance, sublimation and the like.

Also, a stabilizer comprising pentaerythritol tetrakis[3-(3,5-dialkyl-4-hydroxyphenyl)propionate] and pentaerythritol tetrakis(3-alkylthiopropionate) is proposed in Japanese Patent Application Kokai (Laid-open) No. 20337/1984. This stabilizer is fairly superior to the conventional ones, but it is not always satisfactory in terms of the thermal and oxidation stability, thermal discoloration resistance, etc. so that there has been a demand for stabilizers of higher performance.

The present inventors extensively studied to solve these problems, and as a result, found that the phenolic type compound represented by the general formula (I), even if it is used alone, gives a very superior thermal and oxidation stability to synthetic resins as compared with the foregoing well-known phenolic type compounds. Additionally when it is used together with a particular sulfur-containing compound in a particular proportion, excellent thermal and oxidation stability not suggested by the conventional antioxidant-combination technique is given to synthetic resins. The present inventors thus completed the present invention.

The phenolic type compound of the present invention represented by the general formula (I) was first synthesized by the present inventors, and it can be produced by the common esterification of a polyhydric alcohol represented by the general formula (II),

wherein n is an integer of 1 to 4,
with 3-(3-tert-butyl-4-hydroxy-5-alkylphenyl)propionic acid represented by the general formula (III),

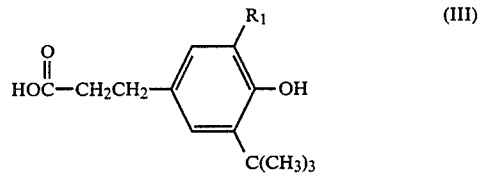

wherein $R_1$ represents a $C_1$–$C_3$ alkyl group,
its acid halide, acid anhydride or mixed acid anhydride, or by the common ester interchange reaction of the polyhydric alcohol with a lower alkyl ester of said acid.

The polyhydric alcohol used in the present invention includes for example glycerin, tetritols (e.g. meso-erythritol, D-erythritol, L-erythritol), pentitols (e.g. xylitol, adonitol, arabitol), hexitols (e.g. sorbitol, mannitol, dulcitol) and the like. In the phenolic type compounds represented by the general formula (I), $R_1$ represents a methyl, ethyl or propyl group, but a methyl group is most preferred in terms of the thermal and oxidation stability.

As typical examples of the compound of the present invention, the following are given:

Compound (I-1): Glycerin tris[3-(3-tert-butyl-4-hydroxy-5-methylphenyl)propionate]

Compound (I-2): Meso-erythritol tetrakis[3-(3-tert-butyl-4-hydroxy-5-methylphenyl)propionate]

Compound (I-3): Xylitol pentakis[3-(3-tert-butyl-4-hydroxy-5-methylphenyl)propionate]

Compound (I-4): Sorbitol hexakis[3-(3-tert-butyl-4-hydroxy-5-methylphenyl)propionate]

Compound (I-5): Glycerin tris[3-(3-tert-butyl-5-ethyl-4-hydroxyphenyl)propionate]

Compound (I-6): Meso-erythritol tetrakis[3-(3-tert-butyl-5-ethyl-4-hydroxyphenyl)propionate]

Compound (I-7): Xylitol pentakis[3-(3-tert-butyl-5-ethyl-4-hydroxyphenyl)propionate]

Compound (I-8): Sorbitol hexakis[3-(3-tert-butyl-5-ethyl-4-hydroxyphenyl)propionate]

Compound (I-9): Glycerin tris[3-(3-tert-butyl-4-hydroxy-5-propylphenyl)propionate]

Compound (I-10): Meso-erythritol tetrakis[3-(3-tert-butyl-4-hydroxy-5-propylphenyl)propionate]

Compound (I-11): Xylitol pentakis[3-(3-tert-butyl-4-hydroxy-5-propylphenyl)propionate]

Compound (I-12): Sorbitol hexakis[3-(3-tert-butyl-4-hydroxy-5-propylphenyl)propionate]

In using the phenolic type compound of the present invention as a stabilizer for synthetic resins, the amount of the compound blended with synthetic resins is generally 0.01 to 5 parts by weight, preferably 0.05 to 1 part by weight based on 100 parts by weight of the synthetic resin.

For blending the compound with synthetic resins, the well-known apparatus and methods for incorporating stabilizers, pigments, fillers, etc. in synthetic resins may be used essentially as such.

In applying the stabilizer for synthetic resins of the present invention, other additives such as antioxidants (e.g. sulfur-containing compounds, phosphite-type compounds, phenolic type compounds other than those mentioned above), ultraviolet absorbers, light stabilizers, metal deactivators, metal soaps, nucleating agents, lubricants, antistatic agents, flame retardants, pigments, fillers and the like may be used together with said stabilizer.

Particularly, by using sulfur-containing compounds such as dialkyl thiodipropionates (e.g. dilauryl thiodipropionate, dimyristyl thiodipropionate, distearyl thiodipropionate) or sulfur-containing compounds represented by the general formula (II-1) or (II-2),

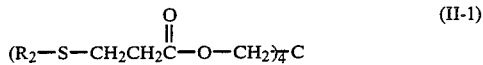  (II-1)

wherein $R_2$ represents a $C_4$–$C_{20}$ alkyl group,

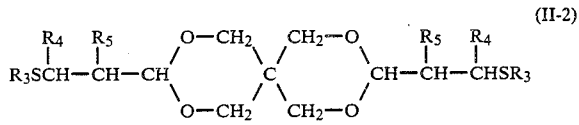  (II-2)

wherein $R_3$ represents a $C_3$–$C_{18}$ alkyl group, and $R_4$ and $R_5$ independently represent a hydrogen atom or a $C_1$–$C_6$ alkyl group, in combination with the phenolic type compound of the present invention, a further improvement in the thermal and oxidation stability can be attained.

Particularly, when the phenolic type compound of the present invention is used together with at least one member selected from the sulfur-containing compounds represented by the general formulae (II-1) and (II-2), such excellent effect not suggested by the well-known techniques of combining phenolic type compounds and sulfur-containing compounds, can be obtained, and therefore using these sulfur-containing compounds together is particularly preferred.

Hereupon, in the compounds represented by the general formula (II-1), the substituent $R_2$ is preferably a $C_6$–$C_{18}$ alkyl group, most preferably a dodecyl group in terms of the thermal and oxidation stability.

Typical examples of such compound are shown in Table 1.

TABLE 1

$$(R_2-S-CH_2CH_2\overset{O}{\overset{\|}{C}}-O-CH_2)_4C$$

| Compound No. | $R_2$ |
|---|---|
| II-1-1 | $-C_6H_{13}$ |
| II-1-2 | $-C_{12}H_{25}$ |
| II-1-3 | $-C_{18}H_{37}$ |

In the compounds represented by the general formula (II-2), the substituent $R_3$ is preferably a $C_8$–$C_{18}$ alkyl group and substituents $R_4$ and $R_5$ are preferably a hydrogen atom or a $C_1$–$C_3$ alkyl group in terms of the thermal and oxidation stability.

Typical examples of such compound are shown in Table 2.

TABLE 2

| Compound No. | $R_3$ | $R_4$ | $R_5$ |
|---|---|---|---|
| II-2-1 | $-C_8H_{17}$ | $-CH_3$ | $-H$ |
| II-2-2 | $-C_{12}H_{25}$ | $-C_4H_9$ | $-H$ |
| II-2-3 | $-C_{12}H_{25}$ | $-CH_3$ | $-H$ |
| II-2-4 | $-C_{18}H_{37}$ | $-CH_3$ | $-H$ |
| II-2-5 | $-C_{12}H_{25}$ | $-H$ | $-H$ |
| II-2-6 | $-C_{18}H_{37}$ | $-H$ | $-CH_3$ |

When the phenolic type compound of the present invention represented by the general formula (I) is used together with at least one member selected from the sulfur-containing compounds represented by the general formulae (II-1) and (II-2), the mixing ratio of (I) to (II) is 1 to 0.5–15 by weight, preferably 1 to 1–10 by weight, more preferably 1 to 2–6 by weight.

When the weight ratio of sulfur-containing compound (II) to phenolic type compound (I) is less than 0.5, a sufficient intended effect is difficult to obtain. Even if the weight ratio exceeds 15, a sufficient effect enough to correspond to that ratio is difficult to obtain, which becomes also disadvantageous economically. Also, the amount of this mixture blended with synthetic resins is generally 0.01 to 5 parts by weight, preferably 0.05 to 1 part by weight based on 100 parts by weight of the synthetic resin. In using the mixture, the phenolic type compound (I) and sulfur-containing compound (II) may separately be blended with the synthetic resin without mixing the both compounds in advance.

Also, the color of synthetic resins can be improved by also using a phosphite type antioxidant. This antioxidant includes for example distearyl pentaerythritol diphosphite, tris(2,4-di-tert-butylphenyl)phosphite, tris(2-tert-butyl-4-methylphenyl)phosphite, bis(2,4-di-tert-butylphenyl)pentaerythritol diphosphite, tetrakis(2,4-di-tert-butylphenyl)-4,4'-biphenylene diphosphite and the like.

Also, the light fastness of synthetic resins can be improved by using ultraviolet absorbers, hindered amine type light stabilizers, etc. such as 2-hydroxy-4-methoxybenzophenone, 2-hydroxy-4-n-octoxybenzophenone, 2-(2-hydroxy-5-methylphenyl)benzotriazole, 2-(2-hydroxy-3-tert-butyl-5-methylphenyl)-5-chlorobenzotriazole, 2-(2-hydroxy-3,5-di-tert-butylphenyl)-5-chlorobenzotriazole, 2-(2-hydroxy-3,5-diamylphenyl)benzotriazole, [2,2'-thiobis(4-tert-octylphenolate)]butylamine nickel complex, 2,2,6,6-tetramethyl-4-piperidyl benzoate, bis(2,2,6,6-tetramethyl-4-piperidyl)sebacate, bis(1,2,2,6,6-pentamethyl-4-piperidyl) 2-(3,5-di-tert-butyl-4-hydroxybenzyl)-2-n-butylmalonate, 1-[2-{3-(3,5-di-tert-butyl-4-hydroxyphenyl)propionyloxy}ethyl]-4-[3-(3,5-di-tert-butyl-4-hydroxyphenyl)propionyloxy]-2,2,6,6-tetramethylpiperidine, dimethyl succinate/1-(2-hydroxyethyl)-4-hydroxy-2,2,6,6-tetramethylpiperidine polycondensation product, a reaction product of dihaloalkylene with N,N'-bis(2,2,6,6-tetramethyl-4-piperidyl)-alkylenediamine, a reaction product of 2,6-dichloro-1,3,5-triazine with N,N'-bis(2,2,6,6-tetramethyl-4-piperidyl)alkylenediamine, etc. together with the phenolic type compound of the present invention.

Thus, by using the phenolic type compounds of the present invention, the stability of synthetic resins is markedly improved. As such synthetic resins, there are given for example poly-α-olefins such as low-density polyethylene, medium- to high-density polyethylene, linear low-density polyethylene, polypropylene, polybutene-1, etc., poly-α-olefin copolymers such as propylene/ethylene random or block copolymers, ethylene/butene-1 random copolymers, etc., copolymers of poly-α-olefin with a vinyl monomer such as maleic anhydride-modified polypropylene, etc., mixtures thereof, chlorinated polyethylene, EVA resin, polyvinyl chloride, methacrylic resin, polystyrene, impact-resistant polystyrene, ABS resin, AES resin, MBS resin, polyethylene terephthalate, polybutylene terephthalate, polyamide, polyimide, polycarbonate, polyacetal, polyurethane, unsaturated polyester resin and the like. Further, said synthetic resins may be rubbers such as isoprene rubber, butadiene rubber, acrylonitrile/butadiene copolymeric rubber, styrene/butadiene copolymeric rubber, etc. and blends of these resins. But, the phenolic type compound of the present invention is particularly effective on polypropylene.

Next, the present invention will be illustrated in detail with reference to the following examples, which are not however to be interpreted as limiting the invention.

EXAMPLE 1

(Production of the Compound I-1)

18.03 Grams (0.072 mole) of methyl 3-(3-tert-butyl-4-hydroxy-5-methylphenyl)propionate and 1.85 g (0.02 mole) of glycerin were mixed, 0.33 g (0.006 mole) of sodium methoxide was added to the mixture, and the temperature was raised. After carrying out reaction at 140° C. for 3 hours, the pressure of the system was reduced to 50~20 mmHg, and reaction was carried out at 140°~150° C. for 10 hours under this reduced pressure. The reaction was continued for further 10 hours while raising the temperature to 190° C. and reducing the pressure to 2 mmHg.

After completion of the reaction, the reaction product was dissolved in toluene, and the toluene solution was washed with a dilute aqueous hydrochloric acid and then with water. Thereafter, toluene was removed by evaporation under reduced pressure to obtain 10.5 g of a crude product of 62% in purity. The product was purified by column chromatography on silica gel to obtain 4.8 g of a 99%-purity, colorless and glassy product, glycerin tris[3-(3-tert-butyl-4-hydroxy-5-methylphenyl)-propionate] (compound I-1).

m.p. 43° C.

Mass analytical value (FD-mass): Molecular ion peak 746

Proton NMR (CDCl$_3$/TMS): δ(ppm) 1.35(27H s), 2.16(9H s), 2.7(12H m), 4.1(5H m), 4.55(3H broad s), 6.80(3H s), 6.91(3H s)

EXAMPLE 2

(Production of the Compound I-2)

A mixture of 24.04 g (0.096 mole) of methyl 3-(3-tert-butyl-4-hydroxy-5-methylphenyl)propionate, 2.45 g (0.02 mole) of mesoerythritol and 0.33 g (0.006 mole) of sodium methoxide was reacted and freed from the catalyst in the same manner as in Example 1. The deposited crystal was recrystallized from toluene to obtain 6.8 g of a 92%-purity white crystal, meso-erythritol tetrakis[3-(3-tert-butyl-4-hydroxy-5-methylphenyl)propionate] (compound I-2).

m.p. 166°–168° C.

Mass analytical value (FD-mass): Molecular ion peak 994

Proton NMR (CDCl$_3$/TMS): δ(ppm) 1.38(36H s), 2.18(12H s), 2.7(16H m), 4.1(6H m), 4.3(4H s), 6.80(4H s), 6.92(4H s)

EXAMPLE 3

(Production of the Compound I-5)

A mixture of 19.04 g (0.072 mole) of methyl 3-(3-tert-butyl-5-ethyl-4-hydroxyphenyl)propionate, 1.85 g (0.02 mole) of glycerin and 0.33 g (0.006 mole) of sodium methoxide was reacted and purified in the same manner as in Example 1 to obtain 4.2 g of a 99%-purity, pale yellow and glassy product, glycerin tris[3-(3-tert-butyl-5-ethyl-4-hydroxyphenyl)propionate] (compound I-5).

Mass analytical value (FD-mass): Molecular ion peak 788

Proton NMR (CDCl$_3$/TMS): δ(ppm) 1.20(9H t), 1.35(27H s), 2.6(18H m), 4.1(5H m), 4.6(3H broad s), 6.81(3H s), 6.91(3H s)

EXAMPLE 4

The following blend was mixed on a mixer for 5 minutes and then melt-kneaded at 180° C. on a mixing roll to obtain a compound. This compound was formed into a sheet of 1 mm in thickness on a hot press kept at 210° C. to prepare a test piece of 40×40×1 mm in size. This test piece was placed in a Geer oven kept at 160° C. and measured for a period of time required for 30% of its area to become brittle. This period of time was taken as a thermal embrittlement induction period and used for evaluation of the thermal and oxidation stability. The result is shown in Table 3.

| Compounding: | Part by weight |
| --- | --- |
| Unstabilized polypropylene resin | 100 |
| Calcium stearate | 0.1 |
| Test compound | variable |

Hereupon, the symbols of test compound in Table 3 show the following compounds:

AO-1: n-Octadecyl 3-(3,5-di-tert-butyl-4-hydroxyphenyl)propionate

AO-2: Pentaerythritol tetrakis[3-(3,5-di-tert-butyl-4-hydroxyphenyl)-propionate]

AO-3: Glycerin tris[3-(3,5-di-tert-butyl-4-hydroxyphenyl)propionate]

AO-4: Meso-erythritol tetrakis[3-(3,5-di-tert-butyl-4-hydroxyphenyl)-propionate]
AO-5: Triethylene glycol bis[3-(3-tert-butyl-4-hydroxy-5-methylphenyl)propionate]
AO-6: Dimyristyl thiodipropionate

TABLE 3

| Example | No. | Phenolic type compound Kind | Part by weight | Sulfur-containing compound Kind | Part by weight | Thermal embrittlement induction period (hr) |
|---|---|---|---|---|---|---|
| Present example | 1 | I-1 | 0.05 | — | — | 140 |
|  | 2 | I-2 | " | — | — | 145 |
|  | 3 | I-5 | " | — | — | 140 |
|  | 4 | I-1 | " | AO-6 | 0.2 | 600 |
|  | 5 | " | " | II-1-2 | " | 1810 |
|  | 6 | I-2 | " | AO-6 | " | 590 |
|  | 7 | " | " | II-1-2 | " | 1800 |
|  | 8 | I-5 | " | AO-6 | " | 560 |
|  | 9 | " | " | II-1-2 | " | 1780 |
| Comparative example | 10 | AO-1 | " | — | — | 30 |
|  | 11 | AO-2 | " | — | — | 50 |
|  | 12 | AO-3 | " | — | — | 45 |
|  | 13 | AO-4 | " | — | — | 45 |
|  | 14 | AO-5 | " | — | — | 80 |
|  | 15 | AO-1 | " | AO-6 | 0.2 | 300 |
|  | 16 | " | " | II-1-2 | " | 310 |
|  | 17 | AO-2 | " | AO-6 | " | 460 |
|  | 18 | " | " | II-1-2 | " | 400 |
|  | 19 | AO-3 | " | AO-6 | " | 410 |
|  | 20 | " | " | II-1-2 | " | 370 |
|  | 21 | AO-4 | " | AO-6 | " | 420 |
|  | 22 | " | " | II-1-2 | " | 360 |
|  | 23 | AO-5 | " | AO-6 | " | 430 |
|  | 24 | " | " | II-1-2 | " | 500 |
|  | 25 | — | — | — | — | 5 |

EXAMPLE 5

The following blend was mixed on a mixer for 5 minutes and then melt-kneaded at 180° C. on a mixing roll to obtain a compound. This compound was formed into a sheet of 1 mm in thickness on a hot press kept at 210° C. to prepare a test piece of 40×40×1 mm in size. This test piece was placed in a Geer oven kept at 160° C. and measured for a period of time required for 30% of its area to become brittle. This period of time was taken as a thermal embrittlement induction period and used for evaluation of the thermal and oxidation stability.

| Compounding: | Part by weight |
|---|---|
| Unstabilized polypropylene resin | 100 |
| Calcium stearate | 0.1 |
| Test compound | variable |

Also, a test piece prepared in the same manner as above was tested for thermal discoloration in a Geer oven kept at 160° C. The thermal discoloration was evaluated by a color difference, ΔYI, between the test piece above and the antioxidant-free test piece before the thermal ageing. The result is shown in Table 4.

In table 4, the symbols of test compound other than those described in Table 3 show the following compounds:

AO-7: 1,3,5-Tris(4-tert-butyl-3-hydroxy-2,6-dimethylbenzyl)isocyanurate
AO-8: Pentaerythritol tetrakis[3-(5-tert-butyl-4-hydroxy-3-methylphenyl)propionate]
AO-9: 1,1,3-Tris(5-tert-butyl-4-hydroxy-2-methylphenyl)butane
AO-10: Dilauryl thiodipropionate
AO-11: Distearyl thiodipropionate

TABLE 4

| No. | Phenolic type compound Kind | Part by weight | Sulfur-containing compound Kind | Part by weight | Thermal embrittlement induction period (hr) | ΔYI 0 (hr) | ΔYI 48 (hr) | ΔYI 504 (hr) |
|---|---|---|---|---|---|---|---|---|
| 1 | I-1 | 0.05 | II-1-1 | 0.2 | 1610 | −1.6 | −15.4 | −7.5 |
| 2 | " | " | II-1-2 | " | 1810 | −1.8 | −16.1 | −8.0 |
| 3 | " | " | II-1-3 | " | 1630 | −1.7 | −15.5 | −7.6 |
| 4 | " | " | II-2-1 | " | 1620 | −1.6 | −15.4 | −7.5 |
| 5 | " | " | II-2-2 | " | 1650 | −1.7 | −15.6 | −7.5 |
| 6 | " | " | II-2-3 | " | 1710 | −1.8 | −15.8 | −7.6 |
| 7 | " | " | II-2-4 | " | 1790 | −1.8 | −16.0 | −7.9 |
| 8 | " | " | II-2-5 | " | 1710 | −1.8 | −15.8 | −7.5 |
| 9 | " | " | II-2-6 | " | 1780 | −1.7 | −15.9 | −7.8 |
| 10 | I-5 | " | II-1-2 | " | 1780 | −1.7 | −15.9 | −7.8 |
| 11 | " | " | II-2-4 | " | 1760 | −1.7 | −15.8 | −7.7 |
| 12 | " | " | II-2-5 | " | 1680 | −1.6 | −15.6 | −7.4 |
| 13 | I-2 | " | II-1-2 | " | 1800 | −1.8 | −16.0 | −8.0 |
| 14 | " | " | II-2-4 | " | 1780 | −1.7 | −15.9 | −7.9 |
| 15 | " | " | II-2-5 | " | 1700 | −1.6 | −15.8 | −7.4 |
| 16 | I-1 | " | AO-10 | " | 470 | −1.2 | −12.7 | — |
| 17 | " | " | AO-11 | " | 620 | −1.5 | −12.9 | −1.0 |
| 18 | I-5 | " | AO-10 | " | 430 | −1.2 | −12.8 | — |
| 19 | " | " | AO-11 | " | 590 | −1.5 | −12.9 | −0.7 |
| 20 | I-2 | " | AO-10 | " | 460 | −1.2 | −12.5 | — |
| 21 | " | " | AO-11 | " | 610 | −1.4 | −12.7 | −0.9 |
| 22 | AO-7 | " | II-1-2 | " | 1200 | 0.5 | −7.5 | 3.7 |
| 23 | " | " | II-2-4 | " | 1150 | 1.0 | −6.7 | 4.5 |
| 24 | " | " | AO-11 | " | 590 | 0.8 | −5.1 | 12.2 |
| 25 | AO-2 | " | II-1-2 | " | 400 | −1.0 | −12.9 | — |
| 26 | " | " | " | 0.3 | 480 | −1.4 | −13.2 | — |
| 27 | " | " | II-2-2 | 0.2 | 390 | −1.0 | −12.8 | — |
| 28 | " | " | II-2-4 | " | 440 | −1.2 | −13.1 | — |
| 29 | " | " | " | 0.3 | 530 | −1.4 | −13.7 | 12.9 |

TABLE 4-continued

| No. | Phenolic type compound Kind | Part by weight | Sulfur-containing compound Kind | Part by weight | Thermal embrittlement induction period (hr) | ΔYI 0 (hr) | ΔYI 48 (hr) | ΔYI 504 (hr) |
|---|---|---|---|---|---|---|---|---|
| 30 | " | " | II-2-5 | 0.2 | 430 | −1.3 | −13.0 | — |
| 31 | " | " | AO-10 | " | 450 | −1.3 | −13.2 | — |
| 32 | " | " | " | 0.3 | 500 | −1.4 | −13.7 | — |
| 33 | " | " | AO-11 | 0.2 | 750 | −1.3 | −13.8 | 1.5 |
| 34 | " | " | " | 0.3 | 820 | −1.5 | −14.2 | 1.2 |
| 35 | AO-8 | " | II-1-2 | 0.2 | 1600 | −1.5 | −14.7 | −1.7 |
| 36 | " | " | II-2-4 | " | 1580 | −1.5 | −14.5 | −1.5 |
| 37 | " | " | AO-10 | " | 460 | −1.4 | −14.0 | — |
| 38 | " | " | AO-11 | " | 620 | −1.4 | −14.1 | 2.1 |
| 39 | AO-9 | " | II-1-2 | " | 510 | −1.3 | −13.7 | 2.3 |
| 40 | " | " | II-2-4 | " | 430 | −1.2 | −13.6 | — |
| 41 | " | " | AO-11 | " | 390 | −1.0 | −13.5 | — |
| 42 | — | — | — | — | 5 | 0.0 | — | — |

EXAMPLE 6

The test compound in Table 5 was bead-peptized together with an anionic surface active agent to prepare a suspension, and a prescribed amount, as shown in Table 5, of the suspension was added to a graft ABS latex. The mixture was, as usual, salted out with an aqueous magnesium sulfate solution, filtered, washed with water and dried to obtain an ABS resin powder which is a test sample. The thermal and oxidation stability of the ABS resin powder was evaluated by the methods described below. The result is shown in Table 5.

1. The degree of discoloration of the ABS resin powder after thermal ageing in a 180° C. Geer oven was observed.
2. The oxygen absorption induction period (I.P.) in a 170° C. oxygen atmosphere was measured using an oxygen absorption induction period measurement apparatus.
3. The ABS resin powder was repeatedly extruded on a small extruder (screw: D=20 mmφ, L/D=25; strand die: D=3 mmφ, L/D=10) under the following condition. The degree of discoloration of the ABS pellet after 4th extrusion was evaluated by a color difference, ΔYI, between said ABS pellet and the antioxidant-free ABS pellet after 1st extrusion.

| Extrusion condition: | | | | |
|---|---|---|---|---|
| Number of revolutions: 40 rpm | | | | |
| | $C_1$ | $C_2$ | $C_3$ | D |
| Temperature | 220° C. | 240° C. | 260° C. | 280° C. |

4. The ABS pellet after the 4th extrusion obtained by the method in 3 above was compression-molded under a condition of 180° C.×10 min. to prepare No. 1 test piece specified by JIS K 7111. Thereafter, the Charpy impact test was carried out according to JIS K 7111 using a Charpy impact tester.

In Table 5, AO-12 shows the following compound:
AO-12: 2,6-Di-tert-butyl-4-methylphenol

TABLE 5

| Test compound | | 1 | 2 | 3 | 4 | 5 | 6 | 7 | 8 |
|---|---|---|---|---|---|---|---|---|---|
| Phenolic type compound | I-1 | 0.5 | 0.5 | 0.5 | | | | | |
| | I-5 | | | | 0.5 | 0.5 | 0.5 | | |
| | I-2 | | | | | | | 0.5 | 0.5 |
| | AO-2 | | | | | | | | |
| | AO-12 | | | | | | | | |
| Sulfur-containing compound | II-1-2 | 0.5 | | | 0.5 | | | 0.5 | |
| | II-2-4 | | 0.5 | | | 0.5 | | | 0.5 |
| | II-2-5 | | | 0.5 | | | 0.5 | | |
| | AO-10 | | | | | | | | |
| Degree of discoloration | After 30 min | Pale yellow | Pale yellow | Pale yellow | Pale yellow | Pale yellow | Pale yellow | Pale yellow | Pale yellow |
| | After 60 min | Yellowish brown | Yellowish brown | Yellowish brown | Yellowish brown | Yellowish brown | Yellowish brown | Yellowish brown | Yellowish brown |
| I.P. (min) | | 210 | 205 | 210 | 195 | 190 | 195 | 205 | 200 |
| ΔYI | | 10.9 | 11.1 | 10.9 | 11.8 | 12.0 | 11.9 | 11.1 | 11.3 |
| Value of Charpy impact test (Kgf·cm/cm) | | 21.2 | 21.7 | 20.4 | 19.0 | 20.5 | 19.2 | 21.0 | 21.5 |

| Test compound | | 9 | 10 | 11 | 12 | 13 | 14 | 15 | 16 |
|---|---|---|---|---|---|---|---|---|---|
| Phenolic type compound | I-1 | | 0.5 | | | | | | |
| | I-5 | | | 0.5 | | | | | |
| | I-2 | 0.5 | | | 0.5 | | | | |
| | AO-2 | | | | | 0.5 | 0.5 | 0.5 | 0.5 |
| | AO-12 | | | | | | | | |
| Sulfur-containing compound | II-1-2 | | | | | 0.5 | 1.0 | | |
| | II-2-4 | | | | | | | 0.5 | |
| | II-2-5 | 0.5 | | | | | | | 0.5 |

TABLE 5-continued

| | AO-10 | | 0.5 | 0.5 | 0.5 | | | | |
|---|---|---|---|---|---|---|---|---|---|
| Degree of discoloration | After 30 min | Pale yellow | Yellowish brown | Yellowish brown | Yellowish brown | Yellowish brown | Yellowish brown | Yellowish brown | Yellowish brown |
| | After 60 min | Yellowish brown | Brown | Brown | Brown | Brown | Brown | Brown | Brown |
| I.P. (min) | | 205 | 145 | 140 | 145 | 145 | 155 | 145 | 145 |
| ΔYI | | 11.2 | 14.3 | 14.8 | 14.5 | 14.5 | 14.7 | 14.3 | 14.5 |
| Value of Charpy impact test (Kgf · cm/cm) | | 20.1 | 11.7 | 11.4 | 11.5 | 11.7 | 12.9 | 11.6 | 11.6 |

| | | No. | | | | | | | |
|---|---|---|---|---|---|---|---|---|---|
| Test compound | | 17 | 18 | 19 | 20 | 21 | 22 | 23 | 24 |
| Phenolic type compound | I-1 | | | | | | | | No addition |
| | I-5 | | | | | | | | |
| | I-2 | | | | | | | | |
| | AO-2 | 0.5 | 0.5 | 0.5 | | | | | |
| | AO-12 | | | | 0.5 | 0.5 | 0.5 | 0.5 | |
| Sulfur-containing compound | II-1-2 | | | | 0.5 | | | | |
| | II-2-4 | | | | | 0.5 | | | |
| | II-2-5 | 1.0 | | | | | 0.5 | | |
| | AO-10 | | 0.5 | 1.0 | | | | 0.5 | |
| Degree of discoloration | After 30 min | Yellowish brown | Yellowish brown | Yellowish brown | Deep brown | Deep brown | Deep brown | Deep brown | Deep brown |
| | After 60 min | Brown | Brown | Brown | Blackish brown | Blackish brown | Blackish brown | Blackish brown | Blackish brown |
| I.P. (min) | | 155 | 145 | 155 | 150 | 150 | 150 | 140 | 10 |
| ΔYI | | 14.8 | 14.6 | 14.9 | 14.5 | 14.6 | 14.8 | 15.0 | 15.9 |
| Value of Charpy impact test (Kgf · cm/cm) | | 13.0 | 11.4 | 13.5 | 12.4 | 12.5 | 12.4 | 11.7 | 7.2 |

Note:
The amount added is the weight of the test compound per 100 parts by weight of the solid matter of the resin.

EXAMPLE 7

To a 25% urethane dope (comprising 25 parts of a polyurethane resin, 3.75 parts of dimethylformamide and 71.25 parts of tetrahydrofuran) was added the test compound shown in Table 6. The amount of the compound added, as shown in Table 6, was expressed by part by weight per 100 parts by weight of the polyurethane resin. The mixture was coated onto polyester film in a thickness of 1.2 mm and dried for 1 hour in a dryer kept at 45° C. The sheet thus obtained was punched into No. 3 dumb-bell test pieces. The test pieces were exposed to light for 60 hours and 120 hours in a fade-O-meter (light source, ultraviolet carbon arc; temperature of black panel, 63±3° C.), and a percent retention of break strength was obtained by the tensile test (tensile rate, 200 mm/min; measurement temperature, 25° C.). The result is shown in Table 6.

wherein n represents an integer of 1 to 4, and A represents a group of the formula,

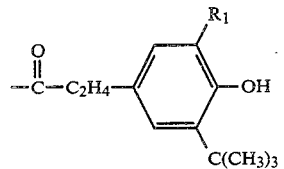

in which $R_1$ is a $C_1$–$C_3$ alkyl group,

TABLE 6

| Test compound | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Phenolic type compound | I-1 | 0.5 | 0.5 | 0.5 | | | | | | | | 0.5 | | | | | | | | | | | | No addition |
| | I-5 | | | | 0.5 | 0.5 | 0.5 | | | | | | 0.5 | | | | | | | | | | | | |
| | I-2 | | | | | | | 0.5 | 0.5 | 0.5 | | | | 0.5 | | | | | | | | | | | |
| | AO-7 | | | | | | | | | | | | | | 0.5 | 0.5 | 0.5 | 0.5 | | | | | | | |
| | AO-2 | | | | | | | | | | | | | | | | | | 0.5 | 0.5 | 0.5 | 0.5 | 0.5 | 0.5 | |
| Sulfur-containing compound | II-1-2 | 0.5 | | | 0.5 | | | 0.5 | | | | | 0.5 | | | | | 0.5 | 1.0 | | 0.5 | | | | |
| | II-2-4 | | 0.5 | | | 0.5 | | | 0.5 | | | | | 0.5 | | | | | | 0.5 | | 0.5 | 1.0 | | |
| | II-2-5 | | | 0.5 | | | 0.5 | | | 0.5 | | | | | 0.5 | | | | | | | | | 0.5 | |
| | AO-10 | | | | | | | | | | 0.5 | 0.5 | 0.5 | | | | 0.5 | | | | | | | | |
| Percent retention of break strength (%) | 60 hr | 57 | 55 | 56 | 53 | 51 | 52 | 56 | 54 | 56 | 38 | 35 | 36 | 35 | 35 | 35 | 35 | 36 | 37 | 36 | 36 | 37 | 36 | 30 |
| | 120 hr | 41 | 37 | 39 | 36 | 32 | 34 | 39 | 36 | 38 | 23 | 20 | 21 | 20 | 19 | 20 | 20 | 21 | 21 | 20 | 21 | 22 | 20 | 16 |

What is claimed is:
1. A stabilizer for synthetic resins containing as an active ingredient a mixture comprising a phenolic compound represented by the formula (I), and at least one member selected from the sulfur-containing compounds represented by the formulae (II-1) and (II-2),

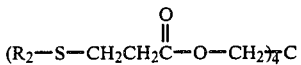

(II-1)

wherein $R_2$ represents a $C_4$-$C_{20}$ alkyl group, and

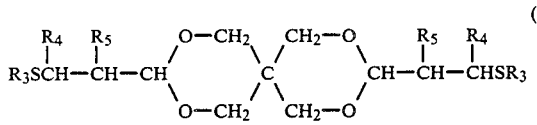

(II-2)

wherein $R_3$ represents a $C_3$-$C_{18}$ alkyl group, and $R_4$ and $R_5$ independently represent a hydrogen atom or a $C_1$-$C_6$ alkyl group, the weight ratio of the phenolic compound to the sulfur-containing compound being 1 to 0.5-15.

2. A stabilizer for synthetic resins as described in claim 1, wherein the phenolic compound is glycerin tris[3-(3-tert-butyl-4-hydroxy-5-methylphenyl)propionate].

3. A stabilizer for synthetic resins as described in claim 1, wherein the phenolic compound is meso-erythritol tetrakis[3-(3-tert-butyl-4-hydroxy-5-methylphenyl)propionate].

4. A stabilizer for synthetic resins as described in claim 1, wherein the phenolic compound is glycerin tris[3-(3-tert-butyl-5-ethyl-4-hydroxyphenyl)propionate].

5. A stabilizer for synthetic resins as described in claim 1, wherein the sulfur-containing compound (II-1) is pentaerythritol tetrakis(3-dodecylthiopropionate).

6. A stabilizer for synthetic resins as described in claim 1, wherein the sulfur-containing compound (II-2) is 3,9-bis(2-dodecylthioethyl)-2,4,8,10-tetraoxaspiro[5.5]undecane.

7. A polyolefin composition containing a stabilizing effective amount of the stabilizer composition of claim 1.

8. A polyolefin composition as described in claim 7, wherein the polyolefin resin is polypropylene.

* * * * *